July 27, 1937.  E. DOZLER  2,088,409
ELECTRIC TRANSLATING CIRCUITS
Filed Feb. 26, 1935
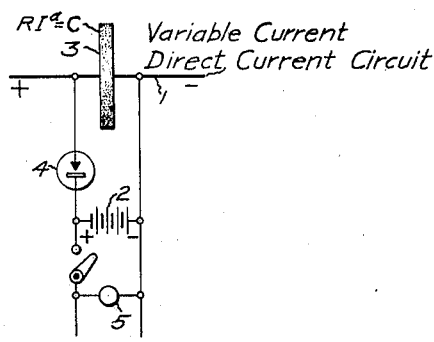
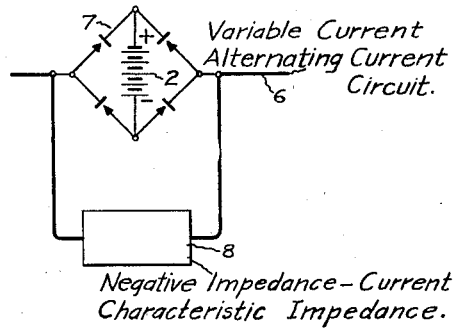
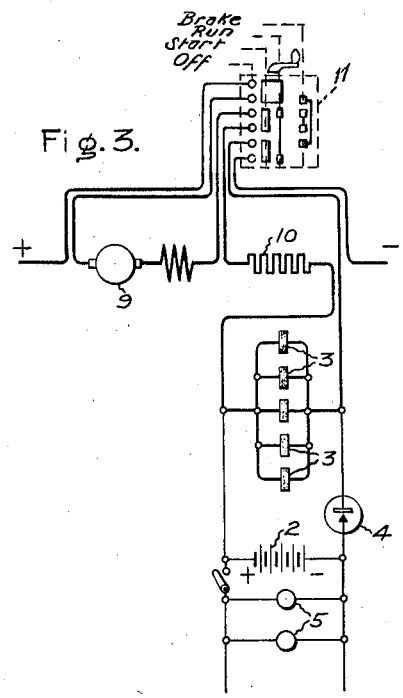
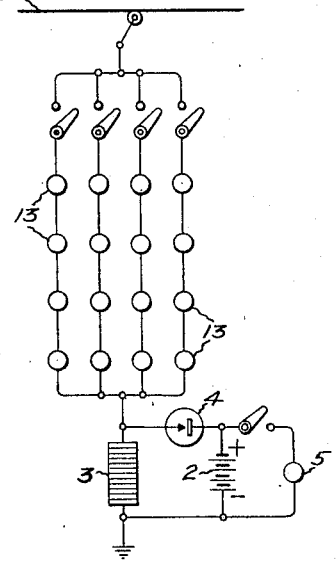
Inventor:
Ernst Dozler.,
by Harry E. Dunham
His Attorney.

Patented July 27, 1937

2,088,409

UNITED STATES PATENT OFFICE 2,088,409

ELECTRIC TRANSLATING CIRCUITS

Ernst Dozler, Berlin-Charlottenburg, Germany, assignor to General Electric Company, a corporation of New York Application February 26, 1935, Serial No. 8,288
In Germany May 26, 1934

10 Claims. (Cl. 171—314)

My invention relates to electric translating circuits and more particularly to a circuit of this kind for charging a storage battery from a relatively high voltage direct current circuit.

A problem which has been recognized for some years is that of obtaining suitable means for charging the storage battery carried on electrically driven vehicles of the type which receive their power from a relatively high voltage direct current supply circuit. Examples of such vehicles are electric locomotives, and multiple unit, interurban and subway trains. Storage batteries are required on such vehicles in order to supply current for control purposes, signs, emergency lights, etc., in case of failure of the main supply circuit. As the voltage of the supply circuit for such vehicles is relatively high (600 volts) and the voltage of the storage battery is relatively low (32 volts) the battery cannot be charged directly from the supply circuit and a special motor generator set for stepping down the voltage for battery charging purposes is relatively expensive and bulky. Various schemes, such as charging the battery in series with the air brake compressor motor have been tried, but they have not proved very satisfactory.

In accordance with my invention, I utilize a negative resistance-current characteristic resistance which may be connected directly in circuit with the driving motors for the vehicle and which has such a characteristic that the voltage drop across it is substantially independent of the circuit current. The storage battery is connected in parallel with the resistance.

It should be understood, however, that although my invention was adapted originally to solve the problem of battery charging on high voltage direct current electric vehicles, my invention is not limited to the solution of this problem and in its broader aspects it is not limited to electric vehicles, or to battery charging, or to direct current circuits, or to a resistance material, and it can be used for obtaining a relatively low and constant potential from a relatively high voltage variable current circuit.

An object of my invention is to provide a novel and simple electric translating circuit.

A further object of my invention is to provide a novel and simple storage battery charging circuit.

My invention will be better understood from the following description taken in connection with the accompanying drawing and its scope will be pointed out in the appended claims.

In the drawing, Fig. 1 is an elementary diagram of an embodiment of my invention for charging a storage battery from a direct current power circuit; Fig. 2 illustrates a modification for use with alternating current power circuits; Fig. 3 illustrates a more detailed application of my invention for charging a storage battery from the energy passed through the starting and braking resistor used in connection with electric traction motors, and Fig. 4 illustrates another application of my invention in connection with vehicle lighting circuits.

Referring now to the drawing and more particularly to Fig. 1 thereof, there is shown a relatively high voltage variable current direct current circuit 1 from which it is desired to charge a storage battery 2. Connected in circuit 1 is a resistor, or piece of resistance material, 3 having a negative resistance-current characteristic of such shape as to exhibit a substantially constant voltage drop throughout the normal range of current carried by circuit 1. A particular example of one such resistance material which is suitable for such use is the refractory conductive material (carborundum and graphite) bonded by a clay or ceramic mixture and matured by heat, which is more commonly known by the trade name "Thyrite". This material is described in an article entitled "Thyrite, A New Material for Lightning Arresters" by K. B. McEachron, published on page 92 of the February, 1930, General Electric Review. This material is also described and claimed in Patent No. 1,822,742, granted September 8, 1931, on an application of K. B. McEachron, and assigned to the assignee of the present application. The resistance-current characteristic of "Thyrite" is expressed by the equation $RI^a=C$ where R is the resistance of the material, I is the current flowing through it, $a$ is an exponent and C is a constant. The exponent $a$ can be varied by varying the controls of the manufacturing process and at the present time "Thyrite" with exponents between .7 and .8 is being produced. It will be observed from the above equation that if the exponent is unity, the voltage drop (RI) is a constant and hence is entirely independent of the current. However, with an exponent between .7 and .8, and for a reasonable range of current, the voltage drop is substantially constant for many practical purposes.

A suitable valve, or rectifier, 4 is connected between the battery and the resistance material 3 so as to prevent the battery from discharging through the resistor. In addition, there is shown a load or translating device, such as an electric lamp 5 connected across the battery so as to be energizable therefrom, as well as from the circuit for charging the battery.

In the operation of the circuit shown in Fig. 1 the current flowing through the resistance material 3 produces an RI voltage drop and due to the characteristics of this material, this voltage drop varies relatively slightly with relatively large variations in current to the circuit 1. Consequently the battery 2 has substantially constant voltage maintained across the terminals, which produces a very desirable battery charging characteristic as the charging rate or charging current will then vary inversely with the state of charge to the battery so that a badly discharged battery having a relatively low counter-voltage will be charged at a much higher rate than a battery which is substantially fully charged and whose counter-voltage has risen to the point where it is substantially equal to the charging voltage.

In Fig. 2 there is shown an alternating current, relatively high voltage variable current power circuit 6 to which the battery 2 is connected by means of any suitable rectifier, such for example, as a bridge connected rectifier 7 as shown. However, it should be understood by those skilled in the art that any other well known and equivalent form of rectifier could equally well be employed. Connected in parallel with the battery and rectifier is a negative impedance-current characteristic impedance of a type having a characteristic which exhibits a substantially constant voltage drop for relatively large variations in current passed therethrough. This impedance may either be a "Thyrite" resistor such as is used in Fig. 1 or it may be a non-linear impedance, or impedance network, of the type utilizing ferro-resonance or any other electrical phenomenon for producing this characteristic. One such impedance is the network disclosed in Horseley et al. Patent No. 1,831,006, granted November 10, 1931.

The operation of Fig. 2 is the same as the operation of Fig. 1 except that the rectifier 7 rectifies the current from the main power circuit 6 which passes through the battery 2. It should be noted that the rectifier 7 also takes the place of the valve 4 in Fig. 1 and prevents the battery discharging through the impedance 8.

It will of course be obvious to those skilled in the art that in alternating current applications of my invention, a suitable negative impedance current characteristic device could be connected across the direct current output terminals of the rectifier, if desired, instead of across the alternating current input terminals.

In Fig. 3 there is illustrated in more detail a specific application of my invention to electric traction motors. Such a motor, which is of the series type, is shown at 9, and it has associated therewith a resistor 10 which is used for reduced voltage starting or for electric braking or both. A suitable controller 11, which may be of any well known type, is provided for controlling the necessary connections for starting the motor 9 through the resistor 10 and for utilizing the resistor 10 as a device for absorbing the energy of the motor 9 when driven as a generator for purposes of braking.

Connected in series with the resistor 10 is a group of "Thyrite" resistances 3 in the form of discs connected in parallel. Connected in parallel with the "Thyrite" resistors 3 is the storage battery 2 which is connected thereto through the valve 4.

The operation of Fig. 3 is essentially the same as that of Fig. 1 and whenever the main line currents flows through the resistor 10 it also flows through the "Thyrite" resistors 3 which, due to their resistance-current characteristics, produce a voltage drop which is substantially constant so that the battery 2 may be safely charged at such time. Lamps 5 may be connected or disconnected to the battery at any suitable time by means of the switch shown.

As a specific example of an arrangement of "Thyrite" discs which might be made in a motor circuit capable of carrying 250 amperes, it is estimated that about 250 discs of "Thyrite" six inches in diameter and one-eighth of an inch thick, each disc having an exponent of about .7, and a constant of approximately 25 would be required. This is based on a heat loss of 25 watts per disc and forced air draft cooling.

In Fig. 4 there is shown an application of my invention in a variable current lighting circuit. In this figure a relatively high voltage direct current trolley 12 supplies a bank of lights 13, and connected in series with the lights is the "Thyrite" resistor 3 across which is connected the battery 2 through valve 4. The "Thyrite" 3 maintains constant voltage across the battery 2 regardless of the number of lamps 13 which are being used.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an electric power supply circuit, a load which requires a relatively widely fluctuating current during normal operating conditions connected in said circuit, a storage battery connected in said circuit to be charged therefrom, and a negative impedance-current characteristic impedance connected in parallel with said battery for minimizing the changes in battery charging current resulting from load current fluctuations in said circuit.

2. In combination, an electric power supply circuit, a load which requires a relatively widely fluctuating current during normal operating conditions connected in said circuit, a storage battery connected in said circuit to be charged therefrom, a negative impedance-current characteristic impedance connected in parallel with said battery for minimizing the changes in battery charging current resulting from load current fluctuations in said circuit, and means for preventing said battery from discharging through said impedance.

3. The combination, with an electric supply circuit and a load connected therein having a wide range of currents, of a storage battery, and means for charging said battery from said circuit comprising a resistor connected in series relation in said circuit and connected in parallel with said battery, said resistor having a negative resistance-current characteristic of such shape that the voltage drop across it is substantially independent of the magnitude of the current in said circuit within said range.

4. The combination, with an electric supply circuit and a load connected therein having a wide range of currents, of a storage battery, means for charging said battery from said circuit comprising a resistor connected in series relation in said circuit and connected in parallel with said battery, said resistor having a negative resistance-current characteristic of such shape that the voltage drop across it is substantially independent of the magnitude of the current in said circuit within said operating range, and means for preventing said battery from discharging through said resistor.

5. The combination, with an electric supply circuit and a load connected therein having a relatively wide range of current flow, of a storage battery, and means for charging said storage battery from said circuit including electrical resistance material connected in series relation in said circuit and connected in parallel with said battery, said material having a resistance-current characteristic expressed by the equation $RI^a = C$, where R is the resistance of the material, I is the current flowing through it, $a$ is an exponent, and C is a constant.

6. In an electric motor driven vehicle, a driving motor, a braking resistor, a controller for dynamically braking said motor by connecting it across said braking resistor, a storage battery, and means for charging said battery comprising a battery charging resistor connected in series circuit relation with the braking resistor and connected in parallel with the said storage battery, said battery charging resistor having a negative resistance-current characteristic of such shape that the voltage drop across it is substantially independent of the magnitude of the current carried by said braking resistor.

7. In an electric motor driven vehicle, a supply circuit, a driving motor, a starting resistor, a controller for starting said motor by connecting it to said circuit in series with said starting resistor, a storage battery and means for charging said battery comprising a battery charging resistor connected in series circuit relation with the starting resistor and connected in parallel with said storage battery, said battery charging resistor having a negative resistance-current characteristic of such shape that the voltage drop across it is substantially independent of the magnitude of the current carried by said starting resistor.

8. In an electric motor driven vehicle, a supply circuit, a driving motor, a combined starting and braking resistor, a controller for starting said motor by connecting it to said supply circuit in series with said resistor and for dynamically braking said motor by disconnecting said motor from said supply circuit and connecting said braking resistor across the terminals of said motor, a storage battery and means for charging said battery comprising a battery charging resistor connected in series circuit relation with the starting and braking resistor and connected in parallel with said storage battery, said battery charging resistor having a negative resistance-current characteristic of such shape that the voltage drop across it is substantially independent of the magnitude of the current carried by said starting and braking resistor.

9. In combination, a variable current alternating current circuit, a negative resistance-current characteristic impedance which produces a substantially constant voltage drop for different currents passed therethrough connected in said circuit, a storage battery connected to be charged with a potential produced by the voltage drop across said impedance, and a rectifier interposed between said battery and said circuit.

10. In combination, a lamp circuit, means for varying the number of lamps in said circuit, a negative impedance-current characteristic impedance connected in said circuit, and a storage battery connected in parallel with said impedance.

ERNST DOZLER.